United States Patent
Nguyen

(10) Patent No.: US 7,032,663 B2
(45) Date of Patent: Apr. 25, 2006

(54) PERMEABLE CEMENT AND SAND CONTROL METHODS UTILIZING PERMEABLE CEMENT IN SUBTERRANEAN WELL BORES

(75) Inventor: Philip D. Nguyen, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 225 days.

(21) Appl. No.: 10/608,319

(22) Filed: Jun. 27, 2003

(65) Prior Publication Data

US 2004/0261993 A1 Dec. 30, 2004

(51) Int. Cl.
*E21B 43/04* (2006.01)
*E21B 33/13* (2006.01)
*C04B 24/04* (2006.01)
*C04B 24/12* (2006.01)
*C04B 22/08* (2006.01)

(52) U.S. Cl. .................. 166/276; 106/724; 106/727; 106/728; 106/729; 106/802; 106/804; 106/810; 106/819; 106/823; 166/292; 166/293; 166/296; 507/211; 507/221; 507/260; 507/273

(58) Field of Classification Search ................ 166/276, 166/296, 293, 292; 106/724, 727, 728, 729, 106/802, 804, 808, 819, 823; 507/211, 221, 507/260, 273
See application file for complete search history.

(56) References Cited

U.S. PATENT DOCUMENTS

| | | | |
|---|---|---|---|
| 2,238,671 A | 4/1941 | Woodhouse | 166/21 |
| 2,288,557 A * | 6/1942 | Vollmer | 166/276 |
| 2,703,316 A | 3/1955 | Schneider | 260/78.3 |
| 3,044,547 A * | 7/1962 | Jarboe, Jr. | 166/276 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,368,623 A * | 2/1968 | Carter et al. | 166/276 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,862,663 A * | 1/1975 | Curtice et al. | 166/276 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/720 |
| 3,955,993 A | 5/1976 | Curtice et al. | 106/662 |
| 3,960,736 A | 6/1976 | Free et al. | 252/8.55 R |
| 3,968,840 A | 7/1976 | Tate | 166/280.1 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,210,455 A * | 7/1980 | Metcalf et al. | 106/727 |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 507/219 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |

(Continued)

FOREIGN PATENT DOCUMENTS

EP 0 510 762 A2 4/1992

(Continued)

OTHER PUBLICATIONS

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

(Continued)

*Primary Examiner*—George Suchfield
(74) *Attorney, Agent, or Firm*—Robert A. Kent; Baker Botts

(57) ABSTRACT

This invention relates to improved methods for completing wells in unconsolidated subterranean zones. More specifically, the present invention relates to cement compositions useful in subterranean applications, and more particularly, to permeable cement compositions and methods for forming consolidated permeable cement masses in well bores to prevent sand influx into the well bores with produced fluids. In one embodiment, the permeable cement compositions of the present invention comprise a hydraulic cement, water, and a degradable material capable of undergoing an irreversible degradation downhole.

43 Claims, No Drawings

U.S. PATENT DOCUMENTS

| | | | |
|---|---|---|---|
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,529,123 A * | 6/1996 | Carpenter et al. | 166/293 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,696,059 A * | 12/1997 | Onan et al. | 507/269 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,823,260 A * | 10/1998 | McConnell et al. | 166/230 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/200 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 * | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/204 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,387,986 B1 | 5/2002 | Moradi-Araghi et al. | 523/211 |
| 6,390,195 B1 * | 5/2002 | Nguyen et al. | 166/276 |
| 6,394,185 B1 * | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,662,873 B1 * | 12/2003 | Nguyen et al. | 166/276 |
| 6,667,279 B1 | 12/2003 | Hessert et al. | 507/225 |
| 6,669,771 B1 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B1 * | 7/2004 | Nguyen et al. | 166/278 |
| 6,763,888 B1 | 7/2004 | Harris et al. | 166/305.1 |
| 6,817,414 B1 | 11/2004 | Lee | 166/278 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0231845 A1 | 11/2004 | Cooke, Jr. | 166/279 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0103496 A1 | 5/2005 | Todd et al. | 166/278 |
| 2005/0252659 A1 | 11/2005 | Sullivan et al. | 166/280.1 |

FOREIGN PATENT DOCUMENTS

| | | |
|---|---|---|
| EP | 0 879 935 A2 | 11/1998 |
| EP | 0 879 935 A3 | 10/1999 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 | 11/2001 |
| WO | WO 02/12674 A1 | 2/2002 |
| WO | WO 03/027431 | 4/2003 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

M. Ahmad, et al.: "Ortho Ester Hydrolysis: Direct Evidence for a Three-Stage Reaction Mechanism,"Engineering Information Inc., NY, NY, vol. 101, No. 10 (XP-002322843), May 9, 1979.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost Effective Method for Stimulating Untapped Reserves*, HO2319R, Halliburton Energy Services, 2000.

Halliburton, *CorbraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch et al, *Aqueous-Based Tackifier Fluids and Methods of Use*, U.S. Appl. No. 10/864,618, filed Jun. 9, 2004.

Cantu, et al., "Laboratory and Field Evaluation of a Combined Fluid-Loss-Control Additive and Gel Breaker for Fracturing Fluids," SPE Paper 18211 (1990).

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted of Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., *Release of BSA from poly(ortho ester) extruded thin strands*, Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "TRIGGER" Useful for Oilfield Applications*, Society of Petroleum Engineers, Inc., SPE 92709, Feb. 4, 2005.

\* cited by examiner

PERMEABLE CEMENT AND SAND CONTROL METHODS UTILIZING PERMEABLE CEMENT IN SUBTERRANEAN WELL BORES

BACKGROUND OF THE INVENTION

1. Field of the Invention

This invention relates to improved methods for completing wells in unconsolidated subterranean zones. More specifically, the present invention relates to cement compositions useful in subterranean applications, and more particularly, to permeable cement compositions and methods for forming consolidated permeable cement masses in well bores to prevent sand influx into the well bores with produced fluids.

2. Description of the Prior Art

Oil, gas, and water producing wells often are completed in unconsolidated subterranean formations containing loose or incompetent sand that flows into the well bores with produced fluids. The presence of this sand in the produced fluids is undesirable as it, inter alia, may erode equipment, which often substantially increases the costs associated with operating such wells and generally reduces the fluid production capability of the formation. Incompetent subterranean formations include those which contain loose sand that is readily entrained by produced fluids, and those wherein the bonded sand particles comprising the formations lack sufficient bond strength to withstand the forces produced by the intermittent production of fluids from the formations.

Heretofore, unconsolidated formations have been treated by creating fractures in the formations and depositing proppant material, e.g., sand of a selected size, in the fractures to substantially preserve the fractures. In addition, the proppant has heretofore been consolidated within the fractures into hard permeable masses to prevent the proppant from flowing back and to reduce the migration of sand through the fractures with produced fluids. Further, costly "gravel packs," which may include sand screens, slotted liners, and the like, have been utilized in wells to prevent the production of formation sand. In gravel packing operations, e.g., graded sand, is placed in the annulus between a screen and the walls of the well bore in the producing interval. The resulting structure provides a barrier to migrating sand while allowing desired fluids to flow into the well bore so that they may be produced.

While gravel packs may prevent the production of sand with formation fluids, they often fail and require replacement. This may be due to, for example, the deterioration of the screen as a result of corrosion or the like. The initial installation of a gravel pack adds considerable expense to the cost of completing a well, and the removal and replacement of a failed gravel pack is even more costly.

In horizontal well bores formed in unconsolidated formations, the well bores are often completed open hole, e.g., a casing is not inserted into the well bore. In open hole well bores, oftentimes a slotted liner, sand control screen, gravel pack, or the like is installed into the uncased well bore. This method of completion may be problematic as discussed above in that as the incompetent formation tends to break down as a result of production, the slotted liner, sand control screen, or gravel pack is often bypassed, which may result in formation sand being produced along with formation fluids.

There have been attempts to use a sort of permeable cement in subsurface applications such as gravel packs wherein the permeable cement composition contains a particulate, such as a carbonate salt or oil-soluble resin particulate, that is dissolvable with the addition of a second fluid, e.g., an acid or a hydrocarbon. The thought behind this approach is generally that when the dissolvable particulate dissolves out of the cement mass, voids are left in the cement mass so that the cement mass has some degree of permeability to formation fluids. Such permeable cement compositions and methods, however, have not been successful because the permeability of the cement mass once the particulate is dissolved out has not been satisfactory. This lack of permeability is caused by, inter alia, the dissolvable particulate's dependence on contact with a second solvent. Oftentimes, the solvent is not able to interact with a sufficient amount of the dissolvable particulate to adequately dissolve a sufficient amount of the particulate. As a result, not enough of the particulate is dissolved out of the cement mass to make the cement mass's permeability suitable for subsurface applications such as gravel packing.

SUMMARY OF THE INVENTION

This invention relates to improved methods for completing wells in unconsolidated subterranean zones. More specifically, the present invention relates to cement compositions useful in subterranean applications, and more particularly, to permeable cement compositions and methods for forming consolidated permeable cement masses in well bores to prevent sand influx into the well bores with produced fluids.

In one embodiment, a method of the present invention for controlling the production of particulates in a subterranean wellbore comprises the following steps: preparing a permeable cement composition comprising a hydraulic cement, water, and a degradable material capable of undergoing an irreversible degradation downhole; placing the permeable cement composition in an annulus between a screen and the walls of the well bore adjacent to a fluid producing zone; and allowing the permeable cement composition to form a permeable cement mass in the annulus.

In another embodiment, a method of the present invention for providing sand control in a subterranean formation penetrated by a well bore comprises the following steps: providing a permeable cement composition comprising a hydraulic cement, water, and a degradable material capable of undergoing an irreversible degradation downhole; placing the permeable cement composition into the subterranean formation by way of a well bore penetrating the formation; and allowing the permeable cement composition to set therein to form a consolidated permeable cement mass to provide sand control.

In another embodiment, a method of the present invention for providing sand control in a wellbore penetrating a subterranean formation comprises the following steps: placing a perforated shroud having perforations, the perforations being sealed by a temporary sealant, in the wellbore adjacent to a chosen subterranean interval; providing a permeable cement composition, the permeable cement composition comprising a hydraulic cement, water, and a degradable material capable of undergoing an irreversible degradation downhole; placing the permeable cement composition in an annulus between the perforated shroud and the chosen subterranean interval; allowing the permeable cement composition to set to form a permeable cement mass in the annulus; and removing the temporary sealant sealing the perforations of the perforated shroud to restore fluid communication between the well bore and the subterranean formation.

In one embodiment, the permeable cement compositions of the present invention for forming a permeable cement mass for use in subterranean sand control operations comprise a hydraulic cement; water, and a degradable material capable of undergoing an irreversible degradation downhole.

In another embodiment, the present invention provides a permeable cement mass useful in well bores penetrating a subterranean formation as a sand control means having voids created by a degradation of a degradable material.

The objects, features and advantages of the present invention will be readily apparent to those skilled in the art upon a reading of the description of the preferred embodiments which follows.

DESCRIPTION OF PREFERRED EMBODIMENTS

The present invention provides improved methods of preventing the production of sand with fluids produced from subterranean formations. The methods presented herein may be utilized in either vertical, deviated, or horizontal wellbores that are open-hole, and/or underreamed, or have casing cemented therein. If the method is carried out in a cased wellbore, in certain embodiments the casing may be perforated to allow for fluid communication between the well bore and the surrounding subterranean zone.

In accordance with the present invention, a permeable cement mass is formed in a well bore adjacent to a producing interval or zone whereby loose or incompetent sands, inter alia, are prevented from entering the well bore with fluids produced from the interval or zone. The permeable cement compositions of the present invention can be used in conjunction with sand control screens if desired. The term "screen" as used herein refers generically to any and all types of permeable structures commonly used in gravel pack operations that permit flow of fluids therethrough while blocking the flow of particulates (e.g., commercially-available screens, slotted or perforated liners or pipes, screened pipes, prepacked screens, expandable-type screens and/or liners, or any combination thereof). After the consolidated permeable cement mass has formed in the well bore, the well is produced and the consolidated permeable cement mass functions as, inter alia, a sand screen. That is, produced liquids and gases flow through the permeable cement mass into the well bore, but formation sands in the formation are prevented from entering the well bore. Thus, the cement is permeable to desirable fluids yet impermeable to undesirable particulates.

The permeable cement compositions of the present invention comprise a hydraulic cement, water, and a degradable material that is capable of undergoing an irreversible degradation downhole. The term "irreversible" as used herein means that the degradable material once degraded downhole, should not recrystallize or reconsolidate while downhole, e.g., the degradable material should degrade in situ but not recrystallize or reconsolidate in situ. The terms "degradation," "degradable", and the like when used herein refer to both the two relatively extreme cases of hydrolytic degradation that the degradable material may undergo, i.e., heterogeneous (or bulk erosion) and homogeneous (or surface erosion), and any stage of degradation in between these two. This degradation may be a result of, inter alia, a chemical or thermal reaction or a reaction induced by radiation.

A variety of hydraulic cements are suitable in the compositions and methods of the present invention including those comprised of calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, and high alkalinity cements. Portland cements are generally preferred. In some embodiments, the Portland cements that are suited for use in conjunction with the present invention are classified as Class A, B, C, G, and H cements according to American Petroleum Institute, *API Specification for Materials and Testing for Well Cements,* API Specification 10, Fifth Ed., Jul. 1, 1990. Another useful cement for certain embodiments of the present invention include a cement that is commercial available under the tradename "THERMALOCK™" from Halliburton Energy Services, Inc., in Duncan, Okla., and described in U.S. Pat. No. 6,488,763, herein incorporated by reference.

Low-density cements are also suitable for use in the compositions and methods of the present invention. Such low-density cements may be foamed cements or may be cements whose density has been reduced by another means including microspheres, low-density polymer beads, or other density-reducing additives. If a low-density cement is utilized, then a mixture of foaming and foam stabilizing dispersants may be used. Generally, the mixture may be included in the cement compositions of the present invention in an amount in the range of from about 1% to about 5% by volume of water in the composition. Using a low-density cement in the methods of the present invention may help minimize the potential of fracturing the walls of the well bore during placement of the cement in the annulus.

The cement component of the compositions of the present invention comprises about 30% to about 70% of the weight of the composition, preferably from about 50% to about 60%.

The water utilized in the cement compositions of this invention can be fresh water, salt water (e.g., water containing one or more salts dissolved therein), brine (e.g., saturated salt water), or seawater. Generally, the water can be from any source provided that it does not contain an excess of compounds that adversely affect other components in the permeable cement composition. The water preferably is present in an amount sufficient to form a pumpable slurry. More particularly, the water is present in the cement compositions in an amount in the range of from about 15% to about 40% by weight of hydraulic cement therein, more preferably in an amount of about 20% to about 35%.

Optionally, a dispersant may be included in the permeable cement compositions of the present invention. If used, the dispersant should be included in the composition in an amount effective, inter alia, to aid in dispersing the cement and the degradable material within the composition. In certain embodiments, about 0.1% to about 5% dispersant by weight of the composition is suitable. In other embodiments, a different range may be suitable. Examples of suitable dispersants include but are not limited to naphthalene sulfonate formaldehyde condensates, acetone formaldehyde sulfite condensates, and glucan delta lactone derivatives. Those skilled in the art with the benefit of this disclosure will recognize that other dispersants may be suitable for a given application.

In order to prevent fluid loss from a permeable cement composition of this invention during placement, a fluid loss additive can be included in the composition. Examples of suitable cement slurry fluid loss control additives include those that are liquids or can be dissolved or suspended in liquids. These include but are not limited to modified synthetic polymers and copolymers, natural gums and their derivatives, derivatized cellulose, and starches. Those skilled in the art with the benefit of this disclosure will recognize that other fluid loss control additives may be suitable for a given application. In some embodiments of the present invention, the fluid loss additive may be present in an amount ranging from about 0% to about 25% by weight of the permeable cement composition.

Other additives such as accelerators (such as triethanolamines, calcium chloride, potassium chloride, sodium formate, sodium nitrate, and other alkali and alkaline earth metal halides, formates, nitrates, and carbonates), retardants (such as sodium tartrate, sodium citrate, sodium gluconate, sodium itaconate, tartaric acid, citric acid, gluconic acid, lignosulfonates, and synthetic polymers and copolymers), weighting agents, thixotropic additives, suspending agents, or the like may also be included in the permeable cement compositions.

Nonlimiting examples of degradable materials that may be used in conjunction with the present invention include but are not limited to degradable polymers, dehydrated salts, and/or mixtures of the two.

As for degradable polymers, a polymer is considered to be "degradable" herein if the degradation is due to, inter alia, chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on factors such as the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable polymers include polysaccharides such as dextran or cellulose; chitin; chitosan; proteins; aliphatic polyesters; poly(lactide); poly(glycolide); poly($\epsilon$-caprolactone); poly(hydroxybutyrate); poly(anhydrides); aliphatic polycarbonates; poly(orthoesters); poly(amino acids); poly(ethylene oxide); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Suitable aliphatic polyesters have the general formula of repeating units shown below:

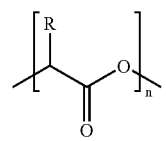

Formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to Formula I without any limitation as to how the polymer was made such as from lactides, lactic acid, or oligomers, and without reference to the degree of polymerization or level of plasticization.

The lactide monomer exists generally in three different forms: two stereoisomers l- and d-lactide and racemic D,L-lactide (meso-lactide). The oligomers of lactic acid, and oligomers of lactide are defined by the formula:

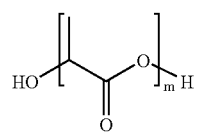

Formula II where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulate is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like $\epsilon$-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

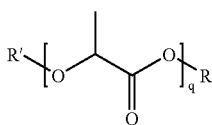

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. Preferably q is an integer: $2 \leq q \leq 10$. As used herein the term "derivatives of oligomeric lactic acid" includes derivatives of oligomeric lactide. In addition to the other qualities above, the plasticizers may enhance the degradation rate of the degradable polymeric materials. The plasticizers, if used, are preferably at least intimately incorporated within the degradable polymeric materials.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosure of which are incorporated herein by reference.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly (suberic anhydride), poly(sebacic anhydride), and poly (dodecanedioic anhydride). Other suitable examples include but are not limited to poly(maleic anhydride) and poly (benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about 1/5th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include but are not limited to anhydrous sodium tetraborate (also known as anhydrous borax), and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide.

Other degradable materials that undergo an irreversible degradation may also be suitable, if the products of the degradation do not undesirably interfere with either the conductivity of the permeable cement mass or with the production of any of the fluids from the subterranean formation.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Dehydrated salts may also be suitable for higher temperature wells.

Also, we have found that a preferable result is achieved if the degradable material degrades slowly over time as opposed to instantaneously. Even more preferable results have been obtained when the degradable material does not begin to degrade until after the permeable cement mass has developed some compressive strength. The slow degradation of the degradable material helps, inter alia, to maintain the stability of the permeable cement mass.

The specific features of the degradable material may be modified to provide the permeable cement mass with optimum permeability while maintaining its desirable functionality. Preferably, the degradable material is selected to have a size, and shape to maintain substantial uniformity within the mixture. Whichever degradable material is utilized, the degradable materials may have any shape, depending on the desired characteristics of the resultant voids in the mass including but not limited to particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the mass. In certain preferred embodiments, a degradable material having a rod-like particle shape is used to create interconnecting channel-like voids in the permeable cement mass. One of ordinary skill in the art with the benefit of this disclosure will recognize the specific degradable material and the preferred size and shape for a given application.

The concentration of the degradable material in the permeable cement composition ranges from about 1% to about 70%, based on the weight of the cement in the composition. A concentration of degradable material between about 20% and about 65% by weight of the cement in the composition is preferable. Additionally, the relative amounts of the degradable material in the permeable cement composition should not be such that when degraded, an undesirable percentage of voids result in the permeable cement mass making the mass potentially ineffective in providing a sand control means. One of ordinary skill in the art with the benefit of this disclosure will recognize an optimum concentration of degradable material that provides desirable values in terms of enhanced permeability and sand control.

In an example of the methods of the present invention, a permeable cement composition of the present invention which forms a permeable cement mass in a subterranean formation to prevent the production of sand with well fluids is prepared on the surface (either on-the-fly or by preblending it), and then pumped and/or displaced into the subterranean formation and/or into perforations therein by way of a well bore penetrating the formation. The methods of the present invention are particularly suitable for preventing sand production in wells completed in unconsolidated formations wherein slotted liners, sand control screens, gravel packs, or the like have heretofore been utilized.

An embodiment of the methods of the present invention includes the following steps. A permeable cement composition of the present invention is provided that comprises a hydraulic cement, water, and a degradable material. The permeable cement composition is placed in the well bore in the annulus adjacent to a sand control screen and a desired interval or zone in the subterranean formation. The permeable cement composition is allowed to set therein, whereby the composition fills and forms a consolidated permeable cement mass in the annulus. As the permeable cement composition begins to gain compressive strength, the degradable material in the permeable cement composition is allowed to begin to degrade whereby a plurality of voids and channels are formed in the cement mass once it has set. After the permeable set cement mass has been formed in the well bore, the well is produced and the permeable cement mass acts as, inter alia, a sand screen.

In another embodiment of the methods of the present invention, a perforated shroud is used rather than a sand screen. In this example of this method, the permeable cement composition of the present invention is pumped into a desired area within the well bore, filling the annulus between the perforated shroud and the wellbore wall and the interior of the shroud, and then allowed to set. As the permeable cement composition begins to gain compressive strength, the degradable material in the permeable cement composition is allowed to begin to degrade, whereby a plurality of voids and channels are formed in the cement mass when set. Once the cement has set, the set cement occupying the interior of the shroud is drilled out so that an annulus of the consolidated permeable cement mass remains in the well bore, inter alia, to prevent formation sands from being produced with desirable fluids.

In another exemplary embodiment, a temporary sealant can be used to seal off the perforations in the perforated shroud before the shroud is placed inside the wellbore. An embodiment of the cement compositions disclosed in the present invention can be placed in the annulus as conventionally applied as cement placement behind the casing, without drilling or milling out the consolidated cement in the interior of the shroud. After the cement has been set, the temporary sealant sealing the perforations of the perforated shroud can be removed to restore the communication between the well bore interior and the reservoir. The permeable cement mass acts as, inter alia, a sand control means.

In certain preferred embodiments, the cement masses formed from the permeable cement compositions of the present invention have a permeability of at least 1 darcies.

The permeable cement compositions of the present invention may be mixed on-the-fly or they may be pre-blended at the wellsite or then transported to the wellsite.

Thus, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of controlling the production of particulates in a subterranean wellbore comprising the steps of:
   (a) preparing a permeable cement composition comprising a hydraulic cement, water, and a degradable material that comprises:
      (i) a degradable polymer chosen from the group consisting of chitins, chitosans, proteins, aliphatic polyesters, poly(lactides), poly(glycolides), poly($\epsilon$-caprolactones), poly(hydroxybutyrates), polyanhydrides, aliphatic polycarbonates, poly(orthoesters), poly(amino acids); poly(ethylene oxides), or polyphosphazenes; and/or
      (ii) a dehydrated salt which will degrade overtime as it hydrates
   (b) placing the permeable cement composition in an annulus between a screen and the walls of the well bore adjacent to a fluid producing zone; and
   (c) allowing the permeable cement composition to form a permeable cement mass in the annulus.

2. The method of claim 1 wherein the permeable cement composition further comprises a dispersant present in an amount sufficient to disperse the hydraulic cement and the degradable material within the permeable cement composition.

3. The method of claim 2 wherein the dispersant is present in the permeable cement composition in an amount ranging from about 0.1% to about 5% by weight of the permeable cement composition.

4. The method of claim 1 wherein the hydraulic cement is calcium, aluminum, silicon, oxygen, or sulfur.

5. The method of claim 1 wherein the hydraulic cement is a Portland cement, pozzolana cement, gypsum cement, high alumina content cement, silica cement, high alkalinity cement, or low-density cement.

6. The method of claim 1 wherein the hydraulic cement is present in the permeable cement composition in amount ranging from about 30% to about 70% by weight of the permeable cement composition.

7. The method of claim 1 wherein the hydraulic cement is present in the permeable cement composition in an amount ranging from about 50% to about 60% by weight of the permeable cement composition.

8. The method of claim 1 wherein the water is present in an amount sufficient to make the permeable cement composition a pumpable slurry.

9. The method of claim 1 wherein the water is fresh water, salt water, or brine.

10. The method of claim 1 wherein the water is present in an amount ranging from about 15% to about 40% by weight of the permeable cement composition.

11. The method of claim 1 wherein the permeable cement composition further comprises a fluid loss additive.

12. The method of claim 11 wherein the fluid loss additive is present in the present in the permeable cement composition in an amount ranging from about 0.1% to about 25% by weight of the permeable cement composition.

13. The method of claim 1 wherein the permeable cement composition is mixed on-the-fly.

14. The method of claim 1 further comprising before step (a) blending the permeable cement composition and transporting the permeable cement composition to the wellsite.

15. The method of claim 1 wherein the degradable polymer further comprises a plasticizer.

16. The method of claim 1 wherein the degradable material comprises a stereoisomer of a poly(lactide).

17. The method of claim 1 wherein the dehydrated salt is anhydrous sodium tetraborate or anhydrous boric acid.

18. The method of claim 1 wherein the degradable material is present in an amount ranging from about 5% to about 70% by weight of the composition.

19. The method of claim 1 wherein the degradable material comprises particles having a rod-like shape.

20. The method of claim 1 wherein the permeable cement mass comprises channel-like voids.

21. The method of claim 1 wherein the cement is a Portland cement and present in an amount of from about 30% to about 70% by weight of the permeable cement composition; the water is fresh water and is present in an amount of from about 15% to about 40% by weight of the cement composition; and the degradable material is a poly(lactic acid) particulate present in an amount of from about 5% to about 70% by weight of the permeable cement composition.

22. A method of providing sand control in a subterranean formation penetrated by a well bore comprising the steps of:
(a) providing a permeable cement composition comprising a hydraulic cement, water, and a degradable material that comprises:
  (i) a degradable polymer chosen from the group consisting of chitins, chitosans, proteins, aliphatic polyesters, poly(lactides), poly(glycolides), poly(ε-caprolactones), poly(hydroxybutyrates), polyanhydrides, aliphatic polycarbonates, poly(orthoesters), poly(amino acids); poly(ethylene oxides), or polyphosphazenes; and/or
  (ii) a dehydrated salt which will degrade overtime as it hydrates
(b) placing the permeable cement composition into the subterranean formation by way of a well bore penetrating the formation; and
(c) allowing the permeable cement composition to set therein to form a consolidated permeable cement mass to provide sand control.

23. The method of claim 22 wherein the permeable cement composition further comprises a dispersant present in an amount sufficient to disperse the hydraulic cement and the degradable material within the permeable cement composition.

24. The method of claim 23 wherein the dispersant is present in the permeable cement composition in an amount ranging from about 0.1% to about 5% by weight of the permeable cement composition.

25. The method of claim 22 wherein the hydraulic cement is calcium, aluminum, silicon, oxygen, or sulfur.

26. The method of claim 22 wherein the hydraulic cement is a Portland cement, pozzolana cement, gypsum cement, high alumina content cement, silica cement, high alkalinity cement, or low-density cement.

27. The method of claim 22 wherein the hydraulic cement is present in the permeable cement composition in amount ranging from about 30% to about 70% by weight of the permeable cement composition.

28. The method of claim 22 wherein the hydraulic cement is present in the permeable cement composition in an amount ranging from about 50% to about 60% by weight of the permeable cement composition.

29. The method of claim 22 wherein the water is present in an amount sufficient to make the permeable cement composition a pumpable slurry.

30. The method of claim 22 wherein the water is fresh water, salt water, or brine.

31. The method of claim 22 wherein the water is present in an amount ranging from about 15% to about 40% by weight of the permeable cement composition.

32. The method of claim 22 wherein the permeable cement composition further comprises a fluid loss additive.

33. The method of claim 34 wherein the fluid loss additive is present in the present in the permeable cement composition in an amount ranging from about 0.1% to about 25% by weight of the permeable cement composition.

34. The method of claim 22 wherein the permeable cement composition is mixed on-the-fly.

35. The method of claim 22 further comprising before step (a) blending the permeable cement composition and transporting the permeable cement composition to the wellsite.

36. The method of claim 22 wherein the degradable polymer further comprises a plasticizer.

37. The method of claim 22 wherein the degradable material comprises a stereoisomer of a poly(lactide).

38. The method of claim 22 wherein the dehydrated salt is anhydrous sodium tetraborate or anhydrous boric acid.

39. The method of claim 22 wherein the degradable material is present in an amount ranging from about 5% to about 70% by weight of the composition.

40. The method of claim 22 wherein the degradable material comprises particles having a rod-like shape.

41. The method of claim 22 wherein the permeable cement mass comprises channel-like voids.

42. The method of claim 22 wherein the cement is a Portland cement and present in an amount of from about 30% to about 70% by weight of the permeable cement composition; the water is fresh water and is present in an amount of from about 15% to about 40% by weight of the cement composition; and the degradable material is a poly(lactic acid) particulate present in an amount of from about 5% to about 70% by weight of the permeable cement composition.

43. The method of claim 22 wherein the wellbore includes a sand screen.

* * * * *